United States Patent [19]

Lewis

[11] Patent Number: 4,712,444

[45] Date of Patent: Dec. 15, 1987

[54] LEVERED OPTICAL MOUNT

[75] Inventor: Lindon L. Lewis, Boulder, Colo.

[73] Assignee: Ball Corporation, Muncie, Ind.

[21] Appl. No.: 907,780

[22] Filed: Sep. 16, 1986

[51] Int. Cl.⁴ .................. G05G 11/00; G02B 5/08; F16M 11/12

[52] U.S. Cl. .................... 74/479; 74/89.15; 108/4; 248/184; 248/487; 350/634

[58] Field of Search ............ 74/89.15, 479; 108/4; 248/476, 487, 184; 350/634; 372/107

[56] References Cited

U.S. PATENT DOCUMENTS

| | | | |
|---|---|---|---|
| 3,204,471 | 9/1965 | Rempel | 350/245 |
| 3,407,018 | 10/1968 | Miller | 350/634 X |
| 4,442,524 | 4/1984 | Reeder et al. | 372/107 |
| 4,573,794 | 3/1986 | Covey et al. | 350/634 X |

Primary Examiner—Allan D. Herrmann
Attorney, Agent, or Firm—Gilbert E. Alberding

[57] ABSTRACT

A mounting device (10) includes first (28) and second (32) levers that are disposed between a base plate (12) and a mounting plate (20) and that are attached to the base plate by flexible metal hinges (36a and 36b). First (56a) and second (56b) adjustment devices extend through the base plate (12) and selectively adjust the angles of inclination of the levers (28 and 32). The levers (28 and 32) each change the angular inclination of the mounting plate (20) about one axis by a smaller angle than the angular change received by that (28 or 32) lever.

21 Claims, 4 Drawing Figures

LEVERED OPTICAL MOUNT

BACKGROUND OF THE INVENTION

1. Field of the Invention

The present invention relates generally to optical mounts for lasers and similar devices. More particularly, the present invention relates to optical mounts in which adjustment around X and Y axes are separated.

2. Description of the Prior Art

In lasers, or optical masers, it is necessary to position reflectors or prisms with extreme angular accuracy in order to maintain the resonated wave within the bounds of the reflector.

Because of the extreme accuracy in angular adjustment that is required, it has been found that excessive hysteresis occurs when attempts have been made to use pinned flexible joints and other joints that include mechanical clearances and/or friction between moving parts. Thus, attempts have been made to eliminate both clearances between actuating parts and friction by flexing metal parts.

In the prior art, as exemplified by Rempel in U.S. Pat. No. 3,204,471, slender rods have been torsionally deflected in order to position an optical element separately around both X and Y axes.

In this type of design, it is necessary to use a relatively thin rod, having a relatively small moment of inertia, in order to provide sufficient torsional deflection within the elastic limit of the material without using a rod of excessive length, and without the overall size of the mount being excessive.

However, as thinner rods are used in an attempt to obtain sufficient torsional deflection for the required adjustment in angles, the resultant optical mount becomes too resilient to hold precise adjustment angles in the face of externally induced vibrations.

In the aforementioned patent, Rempel has attempted to overcome this design limitation by loosening clamping bolts and allowing the rods to rotate without torsional deflection to achieve coarse adjustment around the X and Y axes, and then tightening the clamping bolts before making fine adjustment to the angles. The limitation of this arrangement is that one of the slender rods can be overstressed any time an operator forgets to loosen the clamping bolts when making coarse adjustments in the angles.

SUMMARY OF THE INVENTION

In the present invention, a square base plate and a square mounting plate are spaced apart and are disposed generally parallel.

The mounting plate is spaced apart from the base plate by a post that includes a spherical end and that projects orthogonally outward along a Z axis from the base plate. The mounting plate includes a socket in the lower surface thereof that is centered at the intersection of X and Y axes on the lower surface. Thus, the intersection of the X and Y axes on the lower surface of the mounting plate is spaced at a predetermined position along the Z axis by the socket and the spherical end of the post.

Two tension springs interconnect the base and mounting plates. One of the springs resiliently rotates the mounting plate toward the base plate around the X axis; and the other spring resiliently rotates the mounting plate toward the base plate around the Y axis.

A split plate, that is divided into first and second levers, is interposed between the base plate and the mounting plate, and is generally parallel to both the base plate and the mounting plate.

The levers of the split plate are separately and flexibly mounted to the base plate by metal flexible hinges; and the levers are separately inclined about their respective metal flexible hinges by adjustment devices that are threaded into the base plate.

The first and second metal flexible hinges are preloaded by inclining at an angle at least one, and preferably both, of the surfaces to which the flexible hinges are attached. For instance, the hinge-mounting end of the first split plate may be inclined at an angle to preload the first metal flexible hinge, the respective end of the base plate may be inclined at an angle to preload the first metal hinge, or both of these hinge-mounting edges may be inclined at an angle to preload the first metal flexible hinge.

The first and second adjustment devices in the base plate contact respective ones of the levers. Each adjustment device contacts one lever at a first distance from the flexible hinge thereof, that lever transmits motion to the mounting plate at a second and smaller distance from the flexible hinge, and the mounting plate receives this transmitted motion at a third distance from the intersection of the X and Y axes that is greater than the second distance.

Thus, the levers each function as compound levers, receiving one angle of inclination from the respective ones of the adjustment devices, and transmitting a smaller angle of inclination to the mounting plate.

It is a primary object of the present invention to provide an optical mount in which separate adjustments are provided for angular positioning of the mount about X and Y axes.

It is another primary object of the present invention to provide an optical mount in which hysteresis is obviated by eliminating all lost motion in the actuating mechanism and eliminating all friction that could cause hysteresis.

It is another object of the present invention to provide an optical mount in which coarse and fine adjustments are continuously made.

It is another object of the present invention to provide an optical mount in which the mount is firmly positioned against non-resilient stops.

It is still another object to provide an optical mount which is compact in design, economical to manufacture, and rugged in construction.

BEST MODE FOR CARRYING OUT THE INVENTION

Figure 1:
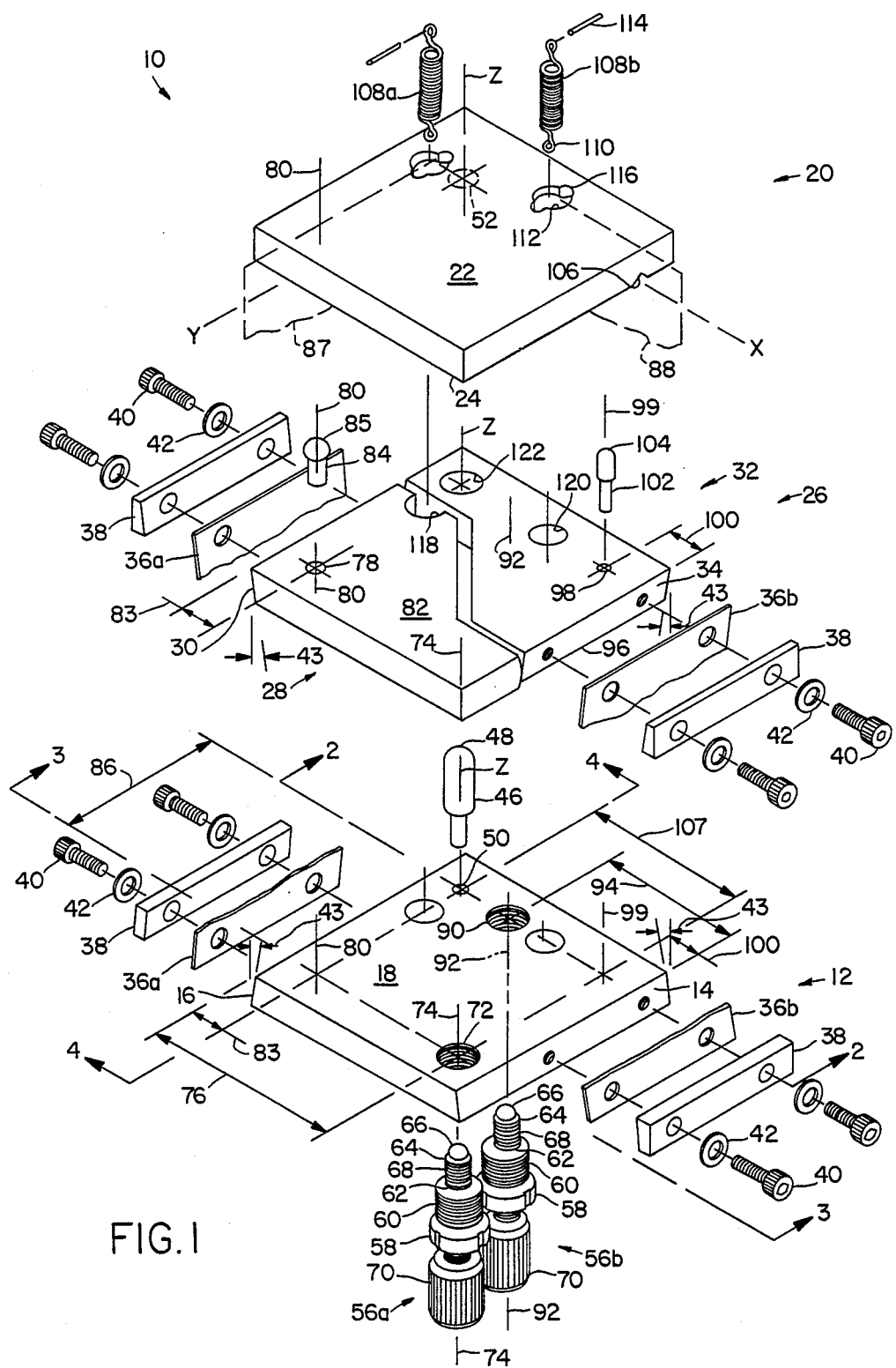
FIG. 1 is an isometric and exploded view of the present invention.
Figure 2:
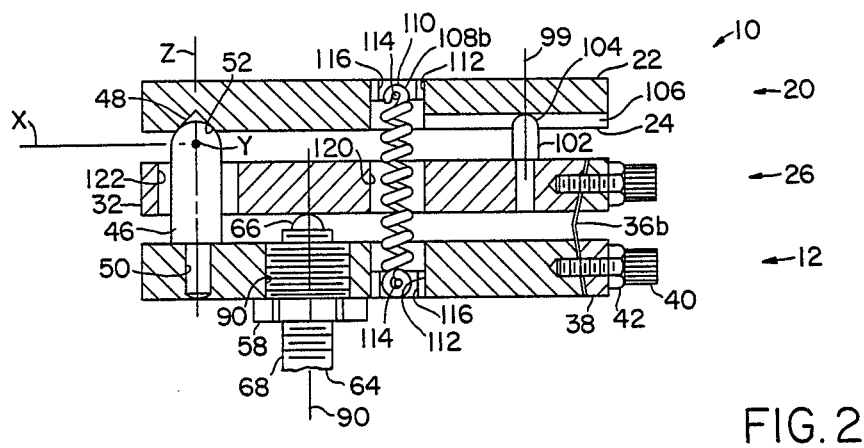
FIG. 2 is a cross-sectional view of the assembled device taken substantially as shown by Section Line 2—2 of FIG. 1.
Figure 3:
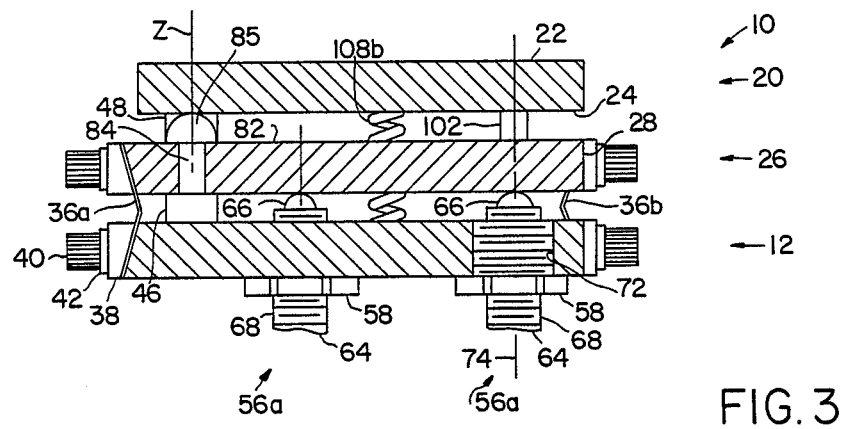
FIG. 3 is a cross-sectional view of the assembled device taken substantially as shown by Section Line 3—3 of FIG. 1.
Figure 4:
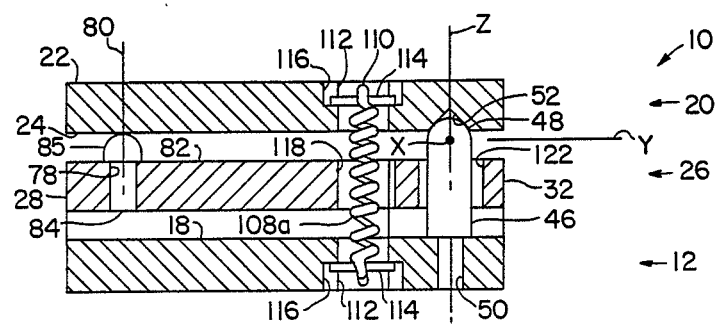
FIG. 4 is a cross-sectional view of the assembled device taken substantially as shown by Section Line 4—4 of FIG. 1.

Referring now to the drawing, a levered optical mount 10 is shown by isometric projection in exploded form. The levered optical mount 10 includes a square base plate 12 having ends 14 and 16 and having a planar upper surface 18, a square mounting plate 20 having a planar mounting surface 22 and having a planar lower surface 24 that is in the plane of X and Y axes which intercept orthogonally on the planar lower surface 24.

The base plate 12 and the mounting plate 20 are generally parallel to each other. A split plate 26 is disposed intermediate of the plates 12 and 20, and is disposed generally parallel to the plates 12 and 20. The split plate 26 is divided into a first lever 28 having an end 30 and a second lever 32 having an end 34.

It will assist the reader in visualizing the levered optical mount 10 in an assembled condition to know that, in a preferred embodiment, the plates 12 and 20 are 50.0 millimeters square and 6.0 millimeters thick; and the plates 12, 20, and 26 are spaced apart from 4.0 to 6.0 millimeters.

The first lever 28 of the split plate 26 is attached to the base plate 12 by a first flexible metal hinge 36a, clamping plates 38, bolts 40 and washers 42, which clamp the first flexible metal hinge 36a to ends 16 and 30 of the base plate 12 and the first lever 28, respectively.

In like manner, the second lever 32 of the split plate 26 is attached to the base plate 12 by a second flexible metal hinge 36b that is attached to the end 14 of the base plate 12 and to the end 34 of the second lever 32 by clamping plates 38, bolts 40, and washers 42.

The ends 14 and 16 of the base plate 12, the end 30 of the split plate 28, and the end 34 of the split plate 32 are all inclined at an angle 43, so that the flexible metal hinges 36a and 36b are resiliently deformed, and so that the flexible metal hinges 36a and 36b resiliently urge respective ones of the levers, 28 and 32, downwardly toward the base plate 12.

A Z axis orthogonally intercepts the base plate 12, extends upwardly through the second lever 32, and upwardly through the mounting plate 20, intercepting the interception of the X and Y axes that are disposed on the lower surface 24 of the mounting plate 20.

A support post 46 having a spherical end 48 is anchored in a hole 50 in the base plate 12. The hole 50 is concentric with the Z axis; so the post 46 extends upwardly along the Z axis. The lower surface 24 of the mounting plate 20 includes a socket 52 that receives the spherical end 48 of the support post 46; so the mounting plate 20 is supported at a predetermined location along the Z axis, and allowed to pivot around both the X and Y axes, by the spherical end 48 and the socket 52.

The levered optical mount 10 includes adjustment devices 56a and 56b. Each of the adjustment devices, 56a and 56b, includes a bushing 58 having external threads 60 and internal threads 62, an adjustment screw 64 having a spherical end 66 and having threads 68 that threadingly engage the internal threads 62 of the bushing 58, and a knob 70 that is fixedly secured to the adjustment screw 64.

The external threads 60 of the bushing 58 are screwed into a threaded hole 72 of the base plate 12. The threaded hole 72 is centered around an axis 74 which is orthogonal to the surface 18 of the base plate 12; the axis 74 is spaced from the end 16 of the base plate 12 by a distance 76; and the flexible metal hinge 36a aligns the ends 16 and 30; so the spherical end 66 of the adjustment device 56a engages the first lever 28 at the first distance 76 from the flexible metal hinge 36.

The first lever 28 includes a hole 78 that is centered around an axis 80. The axis 80 is orthogonal to a surface 82 of the first lever 28; and the axis 80 is displaced from the end 30 of the first lever 28 by a distance 83.

A pin 84 having a spherically shaped head 85 is pressed into the hole 78; and the spherically shaped head 85 of the pin 84 presses upward, in accordance with manual adjustment of the adjustment device 56a, against the lower surface 24 of the mounting plate 20 in the location wherein the axis 80 intercepts the lower surface 24.

Preferably, the distance 76 is about six times as large as the distance 83; so, for a given adjustment of the adjustment device 56a, the pin 84 moves upwardly only one-sixth as far as the spherical end 66 moves upwardly. Also, preferably a distance 86, from the Z axis to the axis 80, is approximately equal to the distance 76; so the resultant change in inclination of the mounting plate 20 about the X axis is approximately one-sixth of the change in the angle of inclination of the first lever 28.

A plane 87 is orthogonal to the surface 18 of the base plate 12, includes the Z axis, the Y axis, and the axis 80. A plane 88 is orthogonal to the surface 18 of the base plate 12, includes the Z axis and the X axis, and is orthogonal to the plane 87.

The external threads 60 of the bushing 58 of the adjustment device 56b are screwed into a threaded hole 90 in the base plate 12. The threaded hole 90 is centered around an axis 92 that is orthogonal to the surface 18 of the base plate 12, and that is spaced from the end 14 of the base plate 12 by a distance 94.

Since the hinge 36b aligns the ends 14 and 34 of the base plate 12 and the second lever 32, the spherical end 66 of the adjustment device 56b engages a lower surface 96 of the second lever 32 at the distance 94 from the hinge 36b.

The second lever 32 includes a hole 98 that is centered around an axis 99 in the plane 88. The axis 99 is orthogonal to the lower surface 96 of the second lever 32, and is located at a distance 100 from the end 34 of the second lever 32.

A pin 102, having a spherical end 104 is pressed into the hole 98; and the spherical end 104 engages a groove 106 in the lower surface 24 of the mounting plate 20 at a location coinciding with the axis 99. The groove 106 is centered about the X axis and is longitudinally disposed along the X axis: and the axis 99 is at a distance 107 from the Z axis.

Preferably, the distance 94 is about four times as large as the distance 100 and the distance 107 is approximately equal to the distance 94; so, a manual change in angular inclination of the second lever 32, as caused by manual adjustment of the adjustment device 56a, will cause a change in the inclination of the mounting plate 20, around the Y axis, by an angle that is about one-fourth as large.

The spherical end 48 of the post 46 cooperates with the socket 52 of the mounting plate 20 to maintain the intersection of the X and Y axes on the Z axis; and the spherical end 104 of the pin 102 cooperates with the groove 106 to maintain the X and Y axes in the planes 88 and 87, respectively.

The levered optical mount 10 includes a first resilient means, for resiliently rotating the mounting plate 20 downwardly around the X axis, for pressing the lower surface 24 of the mounting plate 20 against the spherical end 85 of the pin 84, and for resiliently pressing the first lever 28 down against the spherical end 66 of the adjustment device 56a.

The first resilient means includes both the spring 108a and the flexible metal hinge 36a. The spring 108a resiliently rotates the mounting plate 20 downwardly around the X axis; and the flexible metal hinge 36a resiliently urges the first lever 28 down against the spherical end 66 of the adjustment device 56a.

In like manner, the levered optical mount 10 includes a second resilient means that includes both the spring 108b and the flexible metal hinge 36b. The spring 108b resiliently rotates the mounting plate 20 downwardly around the Y axis; and the flexible metal hinge 36b resiliently urges the second lever 32 down against the adjustment device 56b.

The springs, 108a and 108b, each include attaching loops 110 at both ends, are inserted through respective ones of holes 112, and are attached to both the base plate 12 and the mounting plate 20 by pins 114. The pins 114 are retained in the loops 110 by being held in elongated counterbores 116 of the plates 12 and 20 by tension of the springs 108a and 108b.

A notch 118 in the first lever 28 of the split plate 26 allows the spring 108a to pass freely through the split plate 26, a hole 120 in the second lever 32 allows the spring 108b to pass freely through the split plate 26, and a hole 122 in the second lever 32 allows the support post 46 to pass through the split plate 26.

In operation, the base plate 12 is fixedly secured to some other member, not shown, and an optical element, not shown, is attached to the mounting plate 20, preferably to the mounting surface 22 thereof. Adjustment of the mounting plate 20 is then made separately for angles of inclination around the X and Y axes by selectively rotating the knobs 70 of the adjustment devices 56a and 56b.

Various changes can be made in the present invention without departing from the scope of the present invention. For instance, the split plate 26 can be on the outside and either the plate 12 or the plate 20 can be disposed between the other two plates; or the number of layers of plates can be increased with a resulting improvement in angular resolution.

While specific apparatus has been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

Industrial Applicability

The present invention is applicable for mounting, and for precisely rotating around X and Y axes, mirrors, gratings or prisms that are used in laser, or optical maser, devices.

I claim:

1. A mounting device (10) for precisely adjusting the inclination of one (20) of the parts thereof with respect to two axes (X and Y), which device comprises:
    a first part (20);
    a second part (12);
    means (46, 48, and 52) for spacing said first part from said second part, for pivotally attaching said first part to said second part, for permitting said first part to pivot around intersecting X and Y axes, and for locating said intersection of said X and Y axes along a Z axis with respect to said second part;
    first inclination adjusting means, comprising a first lever (28) that is flexibly attached to one (12) of said parts by a flexible metal hinge (36a), for receiving a first angular adjustment, and for rotating said first part around said X axis by a first inclination angle that is smaller than said first angular adjustment; and
    second inclination adjusting means, for receiving a second angular adjustment, and for rotating said first part around said Y axis by a second inclination angle that is smaller than said second angular adjustment.

2. A mounting device (10) as claimed in claim 1 in which said first inclination adjustment means comprises means for transmitting motion from one (12) of said parts to said first lever (28) at a first distance (76) from said flexible metal hinge (36a), and for transmitting motion to the other (20) of said parts from a location on said first lever that is at a second (83) and smaller distance from said flexible metal hinge.

3. A mounting device (10) as claimed in claim 2 in which said first inclination adjustment means comprises resilient means (108a) for resiliently urging said first part (20) to pivot around said X axis.

4. A mounting device (10) as claimed in claim 2 in which said first inclination adjustment means comprises resilient means (36a) for resiliently urging said first lever (28) toward one (12) of said parts.

5. A mounting device (10) as claimed in claim 3 in which said transmitting of motion from said first lever (28) to said first part (20) comprises transmitting motion to said first part at a third distance (86) from said intersection of said X and Y axes; and
    said third distance is greater than said second distance (83).

6. A mounting device (10) as claimed in claim 5 in which said means for spacing of said first part (20) from said second part (12) and for locating said intersection of said X and Y axes along said Z axis with respect to said second part comprises a socket (52), and a post (46) having a spherical end (48).

7. A mounting device (10) as claimed in claim 6 in which one of said inclination adjusting means and said transmitting of motion to said first part (20) comprises a groove (106) in said one part that extends longitudinally along said X axis.

8. A mounting device (10) for precisely adjusting the inclination of one (20) of the parts thereof with respect to two axes (X and Y), which device comprises:
    a first plate (20) being disposed in a plane that is defined by orthogonally intersecting X and Y axes;
    a second plate (12);
    means (46, 48, and 52) for spacing said first plate from said second plate, for locating the intersection of said X and Y axes at a predetermined location along a Z axis, and for permitting said first plate to pivot around said X and Y axes;
    first inclination adjusting means, comprising a first lever (28) that is flexibly attached to said second plate by a first flexible metal hinge (36a), for receiving a first angular adjustment, and for rotating said first plate around said X axis by a first inclination angle that is smaller than said first angular adjustment;
    second inclination adjusting means, comprising a second lever (32) that is flexibly attached to said second plate by a second flexible metal hinge (36b), for receiving a second angular adjustment, and for rotating said first plate around said Y axis by a second inclination angle that is smaller than said second angular adjustment; and said first and second levers comprise a split plate (26).

9. A mounting device (10) as claimed in claim 8 in which said first inclination adjustment means comprises means for transmitting motion from said second plate (12) to said first lever (28) at a first distance (76) from said flexible metal hinge (36a), and for transmitting motion to said first plate (20) from a location on said first lever that is at a second (83) and smaller distance from said flexible metal hinge.

10. A mounting device (10) as claimed in claim 9 in which said first inclination adjustment means comprises resilient means (108a) for resiliently urging said first plate (20) to pivot around said X axis.

11. A mounting device (10) as claimed in claim 9 in which said first inclination adjustment means comprises resilient means (36a) for resiliently urging said first lever (28) toward one (12) of said plates.

12. A mounting device (10) as claimed in claim 10 in which said transmitting of motion from said first lever (28) to said first plate (20) comprises transmitting motion to said first plate at a third distance (86) from said intersection of said X and Y axes; and said third distance is greater than said second distance (83).

13. A mounting device (10) as claimed in claim 12 in which said spacing of said first plate (20) at a predetermined location along said X and Y axes comprises a socket (52) and a post (46) having a spherical end.

14. A mounting device (10) as claimed in claim 13 in which one of said inclination adjusting means and said transmitting of motion to said first plate comprises a groove (106) in said one plate (20) that extends longitudinally along said X axis.

15. A mounting device (10) for precisely adjusting the inclination of one (20) of the parts thereof with respect to two axes (X and Y), which device comprises:

a first plate (20) being disposed in a plane that is defined by orthogonally intersecting X and Y axes;

a second plate (12) being disposed generally parallel to said first plate;

means (46, 48 and 52), for spacing said first plate from said second plate, for locating the intersection of said X and Y axes at a predetermined location along a Z axis from said second plate, and for permitting said first plate to pivot around said X and Y axes;

a split plate (26), being disposed generally parallel to said first and second plates, and being divided into first (28) and second (32) levers;

a first flexible metal hinge (36a) being fixedly secured to said first lever and being secured to said second plate;

a second flexible metal hinge (36b) being fixedly secured to said second lever and being secured to said second plate;

first adjusting means for adjustably inclining said first lever at a first angle, and for using said inclination of said first lever to adjustably incline said first plate around said X axis at a second angle that is smaller than said first angle; and second adjusting means for adjustably inclining said second lever at a third angle, and for using said inclination of said second lever to adjustably incline said first plate around said Y axis at a fourth angle that is smaller that said third angle.

16. A mounting device (10) as claimed in claim 15 in which said first adjusting means comprises means for transmitting a first motion from said second plate (12) to said first lever (28) at a first distance (76) from said first flexible metal hinge (36a), for receiving a second motion from said first lever at a second distance (83) from said first flexible metal hinge that is smaller than said first distance, and for transmitting said second motion to said first plate a third distance (86) from said intersection of said X and Y axes that is greater than said second distance, and second adjusting means comprises means for transmitting a third motion from said second plate (12) to said second lever (32) at a fourth distance (94) from said second flexible metal hinge (36b), for receiving a fourth motion from said second lever at a fifth distance (100) from said second flexible metal hinge that is smaller than said fourth distance, and for transmitting said second motion to said first plate at a sixth distance (107) from said intersection of said X and Y axes that is greater than said fifth distance.

17. A mounting device (10) as claimed in claim 16 in which said first inclination adjustment means comprises resilient means (108a and 108b) for resiliently urging said first plate (20) to pivot around said X and Y axes.

18. A mounting device (10) as claimed in claim 16 in which said first inclination adjustment means comprises resilient means (36a) for resiliently urging said first lever (28) toward one (12) of said plates.

19. A mounting device (10) as claimed in claim 17 in which said spacing of said first plate (20) at a predetermined location along said X and Y axes comprises a socket (52) and a post (46) having a spherical end (48).

20. A mounting device (10) as claimed in claim 19 in which one of said inclination adjusting means and said transmitting of motion to said first plate (20) comprises a groove (106) in said one plate that extends longitudinally along said X axis.

21. A mounting device (10) as claimed in claim 20 in which said split plate (26) is disposed intermediate of said first (20) and second (12) plates.

* * * * *